US008180754B1

(12) United States Patent
Ershov (10) Patent No.: US 8,180,754 B1
(45) Date of Patent: May 15, 2012

(54) SEMANTIC NEURAL NETWORK FOR AGGREGATING QUERY SEARCHES (75) Inventor: Alexander V. Ershov, Sergiev Posad (RU)

(73) Assignee: Dranias Development LLC, Wilmington, DE (US)

( * ) Notice: Subject to any disclaimer, the term of this patent is extended or adjusted under 35 U.S.C. 154(b) by 296 days.

(21) Appl. No.: 12/416,210

(22) Filed: Apr. 1, 2009

Related U.S. Application Data (60) Provisional application No. 61/041,428, filed on Apr. 1, 2008.

(51) Int. Cl.
*G06F 7/00* (2006.01)
*G06F 17/30* (2006.01)
(52) U.S. Cl. ...................................................... 707/706
(58) Field of Classification Search .................... 707/706
See application file for complete search history.

(56) References Cited

U.S. PATENT DOCUMENTS

| | | | |
|---|---|---|---|
| 5,086,479 A | 2/1992 | Takenaga et al. | |
| 5,506,937 A | 4/1996 | Ford et al. | |
| 5,535,303 A | 7/1996 | Ekchian et al. | |
| 5,546,503 A | 8/1996 | Abe et al. | |
| 5,546,529 A | 8/1996 | Bowers et al. | |
| 5,548,683 A | 8/1996 | Engel et al. | |
| 5,794,178 A | 8/1998 | Caid et al. | |
| 5,812,134 A | 9/1998 | Pooser et al. | |
| 5,819,245 A | 10/1998 | Peterson et al. | |
| 5,937,084 A | 8/1999 | Crabtree et al. | |
| 5,963,965 A | 10/1999 | Vogel | |
| 5,966,126 A | 10/1999 | Szabo | |
| 6,076,051 A * | 6/2000 | Messerly et al. ................... 704/9 |
| 6,112,203 A * | 8/2000 | Bharat et al. ........................... 1/1 |
| 6,138,128 A | 10/2000 | Perkowitz et al. | |
| 6,167,398 A | 12/2000 | Wyard et al. | |
| 6,256,623 B1 | 7/2001 | Jones | |
| 6,304,864 B1 | 10/2001 | Liddy et al. | |
| 6,463,423 B1 | 10/2002 | Wada | |
| 6,574,632 B2 | 6/2003 | Fox et al. | |
| 6,615,197 B1 | 9/2003 | Chai | |
| 6,633,868 B1 | 10/2003 | Min et al. | |
| 6,640,302 B1 * | 10/2003 | Subramaniam et al. ...... 713/169 |
| 6,725,217 B2 | 4/2004 | Chow et al. | |
| 6,829,428 B1 | 12/2004 | Quintos | |

(Continued)

OTHER PUBLICATIONS

Benford et al., Three Dimensional Visualization of the World Wide Web, Dec. 1999, ACM Computing Surveys, pp. 1-16.

(Continued)

*Primary Examiner* — Rehana Perveen
*Assistant Examiner* — Muluemebet Gurmu (57) ABSTRACT

A system, method and computer program product for implementation of a Aggregate Neural Semantic Network, which stores the relationships and semantic connections between the key search words for each user. The Aggregate Neural Semantic Network processes the search results produced by a standard search engine such as, for example, Google or Yahoo!. The set of hits produced by the standard search engine is processed by the Aggregate Neural Semantic Network, which selects the hits that are relevant to a particular user based on the previous search queries made by the user. The Aggregate Neural Semantic Network can also use the connections between the terms (i.e., key words) that are most frequently used by all of the previous Aggregate Neural Semantic Network users. The Aggregate Neural Semantic Network is constantly updating and self-teaching. The more user queries are processed by the Aggregate Neural Semantic Network, the more comprehensive processing of search engine outputs is provided by the Aggregate Neural Semantic Network to the subsequent user queries.

19 Claims, 3 Drawing Sheets

U.S. PATENT DOCUMENTS

| | | | |
|---|---|---|---|
| 6,931,604 | B2 | 8/2005 | Lane |
| 6,938,034 | B1 | 8/2005 | Kraft et al. |
| 6,999,959 | B1 | 2/2006 | Lawrence et al. |
| 7,152,064 | B2 | 12/2006 | Bourdoncle et al. |
| 7,181,438 | B1 | 2/2007 | Szabo |
| 7,296,009 | B1 | 11/2007 | Jiang et al. |
| 7,337,398 | B1 | 2/2008 | Thrall et al. |
| 7,536,316 | B2 | 5/2009 | Ozer et al. |
| 7,565,627 | B2 | 7/2009 | Brill et al. |
| 7,584,175 | B2 | 9/2009 | Patterson |
| 7,610,195 | B2 * | 10/2009 | Ojanpera .................. 704/200.1 |
| 7,620,607 | B1 * | 11/2009 | Ershov ............................ 706/12 |
| 7,778,946 | B2 * | 8/2010 | Hercus ............................ 706/16 |
| 2002/0042741 | A1 | 4/2002 | Wilson et al. |
| 2002/0042750 | A1 | 4/2002 | Morrison |
| 2002/0154167 | A1 | 10/2002 | Parsons et al. |
| 2002/0156702 | A1 | 10/2002 | Kane |
| 2002/0174101 | A1 | 11/2002 | Fernley et al. |
| 2003/0069873 | A1 | 4/2003 | Fox et al. |
| 2003/0212663 | A1 | 11/2003 | Leno et al. |
| 2003/0212669 | A1 | 11/2003 | Dedhia et al. |
| 2003/0216919 | A1 | 11/2003 | Roushar |
| 2004/0015408 | A1 | 1/2004 | Rauen, IV et al. |
| 2004/0078268 | A1 | 4/2004 | Sprogis |
| 2004/0083206 | A1 | 4/2004 | Wu et al. |
| 2004/0111319 | A1 | 6/2004 | Matsumoto et al. |
| 2004/0172378 | A1 | 9/2004 | Shanahan et al. |
| 2004/0181547 | A1 | 9/2004 | Mazzagatti |
| 2004/0225722 | A1 | 11/2004 | Jeong |
| 2005/0080776 | A1 * | 4/2005 | Colledge et al. ................ 707/3 |
| 2005/0086186 | A1 | 4/2005 | Sullivan et al. |
| 2005/0132305 | A1 | 6/2005 | Guichard et al. |
| 2005/0144158 | A1 * | 6/2005 | Capper et al. .................... 707/3 |
| 2005/0165747 | A1 | 7/2005 | Bargeron et al. |
| 2005/0165766 | A1 | 7/2005 | Szabo |
| 2005/0246296 | A1 | 11/2005 | Ma et al. |
| 2005/0278443 | A1 | 12/2005 | Winner et al. |
| 2006/0069617 | A1 | 3/2006 | Milener et al. |
| 2006/0085395 | A1 | 4/2006 | Cradick et al. |
| 2006/0106793 | A1 | 5/2006 | Liang |
| 2006/0149721 | A1 | 7/2006 | Langford |
| 2006/0190285 | A1 | 8/2006 | Harris et al. |
| 2006/0190812 | A1 | 8/2006 | Ellenby et al. |
| 2006/0195442 | A1 | 8/2006 | Cone et al. |
| 2006/0200445 | A1 | 9/2006 | Chen et al. |
| 2006/0200461 | A1 | 9/2006 | Lucas et al. |
| 2006/0218522 | A1 | 9/2006 | Hanechak |
| 2006/0265417 | A1 | 11/2006 | Amato et al. |
| 2006/0287919 | A1 | 12/2006 | Rubens et al. |
| 2006/0287985 | A1 | 12/2006 | Castro et al. |
| 2006/0288023 | A1 | 12/2006 | Szabo |
| 2006/0294094 | A1 | 12/2006 | King et al. |
| 2007/0009151 | A1 | 1/2007 | Pittman et al. |
| 2007/0011150 | A1 | 1/2007 | Frank |
| 2007/0022068 | A1 | 1/2007 | Linsker |
| 2007/0073580 | A1 | 3/2007 | Perry et al. |
| 2007/0073591 | A1 | 3/2007 | Perry et al. |
| 2007/0156677 | A1 | 7/2007 | Szabo |
| 2007/0192164 | A1 | 8/2007 | Nong et al. |
| 2007/0192281 | A1 | 8/2007 | Cradick et al. |
| 2007/0192306 | A1 * | 8/2007 | Papakonstantinou et al. .... 707/5 |
| 2007/0198951 | A1 | 8/2007 | Frank |
| 2007/0204238 | A1 | 8/2007 | Hua et al. |
| 2007/0214415 | A1 | 9/2007 | Williams |
| 2007/0219940 | A1 | 9/2007 | Mueller et al. |
| 2007/0239541 | A1 | 10/2007 | Kane et al. |
| 2007/0255671 | A1 * | 11/2007 | Fox et al. ......................... 706/54 |
| 2007/0294641 | A1 | 12/2007 | Rashkovskiy |
| 2008/0046406 | A1 | 2/2008 | Seide et al. |
| 2008/0052638 | A1 | 2/2008 | Frank et al. |
| 2008/0177717 | A1 | 7/2008 | Kumar et al. |

OTHER PUBLICATIONS

Bengio et al., "A Neural Probabilistic Language Model," Journal of Machine Learning Research 3 (2003) pp. 1137-1155.

Bloehdorn et al., "Semantic Annotation of Images and Videos for Multimedia Analysis", ESWC 2005, pp. 592-607.

Bonnyman et al. "A Neural Network Application for the Analysis and Synthesis of Multilingual Speech", 1994, SIPNN, pp. 327-330.

Brause et al. "Transform Coding by Lateral Inhibited Neural Nets", Porc. IEEE TAI, 1993, pp. 14-21.

Dursteler, Juan C., InfoVis, http://www.infovis.net/printMag.php?num=97&lang=2, KartOO, Aug. 19, 2002, 3 pages.

El-Kwae, et al., "Tug-Of-War: A Simple 2D Web Visualization Technique," Proceedings SPIE vol. 4665, Visualization and Data Analysis 2002, pp. 207-217.

Fagan, Jody Condit, "Basic Search and Visual Search: Usability Tests with EBSCOhost," Electronic Resources & Libraries conference, Mar. 24, 2006, 62 pages.

Final Office Action on U.S. Appl. No. 12/472,204, mailed Apr. 27, 2011.

Golstev et al., "An Assembly Neural Network for Texture Segmentation," Neural Networks, vol. 9, No. 4, Jun. 1996, pp. 643-653.

Golstev, et al., "Inhibitory Connections in the Assembly Neural Network for Texture Segmentation," Neural Networks, vol. 11, No. 5, Jul. 1998, pp. 951-962.

Hämäläinen et al., "TUTNC: a general purpose parallel computer for neural network computations," Microprocessors and Microsystems vol. 19, No. 8, Oct. 1995, pp. 447-465.

Jones, Steve, "Graphical Query Specification and Dynamic Result Previews for a Digital Library," Proceedings of UIST, The 11$^{th}$ Annual ACM Symposium on User Interface Software and Technology, Table of Contents, 1998, pp. 143-151.

K.L. Kwok, "A Neural Network for Probabilistic Information Retrieval," Western Connecticut State University, 1989, pp. 21-30.

Kussul et al., "Structure of Neural Assembly," Neuroinformatics and Neurocomputers, RNNS/IEEE Symposium Oct. 7-10, 1992, vol. 1, pp. 423-434.

Merkl "Text classification with self-organizing maps: Some lessons learned", Neurocomputing 21 (1998) pp. 61-77.

Nejad, A & Gedeon, T. "Bidirectional Neural Network and Class Prototypes", IEEE Conf. Neural Networks, 1995, pp. 1322-1327.

Non-Final Office Action on U.S. Appl. No. 12/234,751, mailed Mar. 17, 2011.

Non-Final Office Action on U.S. Appl. No. 12/327,422, mailed May 9, 2011.

Non-Final Office Action on U.S. Appl. No. 11/468,692, mailed May 13, 2008.

Non-Final Office Action on U.S. Appl. No. 12/362,017, mailed Nov. 24, 2009.

Non-Final Office Action on U.S. Appl. No. 12/472,204, mailed Oct. 6, 2010.

Notice of Allowance on U.S. Appl. No. 12/362,017, mailed Mar. 8, 2011.

Paralic et al. "Text Mining for Documents Annotation and Ontology Support", http://people.tuke.sk/jan.paralic/papers/BookChapter.pdf, A Book Chapter in Intelligent Systems in the Service of Mankind, Nov. 2003, 11 pages.

Qin He, "Neural Network and Its Application in IR," Graduate School of Library and Information Science, University of Illinois at Urbana-Champaign Spring, 1999, 31 pages.

Schmelev et al., Equilibrium Points of Single-Layered Neural Networks with Feedback and Applications in the Analysis of Text Documents, pp. 164-170, 2005.

Tomita et al., "Interactive Web Search by Graphical Query Refinement," Poster Proceedings of the 10th International World Wide Web Conference (WWW10), 5 pages, 2001.

Yusoff "Artificial Neural Networks (ANN) and Its Application in Engineering", http://ppt.ump.edu.my/images/mech/Ann.pdf, 6 pages (no date given).

Final Office Action on U.S. Appl. No. 12/327,422, mailed Oct. 25, 2011.

Final Office Action on U.S. Appl. No. 12/234,751, mailed Sep. 6, 2011.

Notice of Allowance on U.S. Appl. No. 12/472,204, mailed Aug. 10, 2011.

Notice of Allowance on U.S. Appl. No. 12/327,422, mailed Mar. 2, 2012.

* cited by examiner

SEMANTIC NEURAL NETWORK FOR AGGREGATING QUERY SEARCHES

CROSS-REFERENCE TO RELATED APPLICATIONS

This application is a non-provisional of U.S. Provisional Patent Application No. 61/041,428; Filed: Apr. 1, 2008, entitled AGGREGATE NEURAL SEMANTIC NETWORK FOR AGGREGATING QUERY SEARCHES, which is incorporated by reference herein in its entirety.

BACKGROUND OF THE INVENTION

1. Field of the Invention

The present invention relates to neural networks and, more particularly, to a Aggregate Neural Semantic Network for processing output of multiple search engines by selecting relevant search results based on user preferences from prior searches and/or multiple searches.

2. Description of the Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines typically return hyperlinks to web pages in which a user is interested. Generally, search engines base their determination of the user's interest on search terms (referred to as a search query) entered by the user. The goal of the search engine is to provide links to high quality, relevant results to the user based on the search query. Typically, the search engine accomplishes this by matching the terms in the search query to a corpus of pre-stored web pages. Web pages that contain the user's search terms are considered to be "hits" and are returned to the user. However, the hits typically contain a lot of irrelevant information.

In an attempt to increase the relevancy and quality of the web pages returned to the user, a search engine may attempt to sort the list of hits so that the most relevant or highest quality pages are at the top of the list of hits returned to the user. For example, the search engine may assign a rank or score to each hit, where the score is designed to correspond to the relevance or importance of the web page.

However, determining appropriate scores for a particular user can be a difficult task. For one thing, the importance of a web page to the user is inherently subjective and depends on the user's interests, knowledge, and attitudes. There is, however, much that can be determined objectively about the relative importance of a web page. Conventional methods of determining relevance are based on the contents of the web page. More advanced techniques determine the importance of a web page based on more than just the content of the web page.

The overriding goal of a search engine is to return the most desirable set of links for any particular search query. Keyword generation is one of the aspects of providing search results and managing the search process. Keywords identify what the documents are "about"—they may be words that are mentioned in the documents themselves, or they may be concepts that are related to the meaning of the document, and which capture, in one term or a phrase, the meaning of the document.

The same words (i.e., terms) can mean different things or concepts to different users. Typically, the same search query will return the same set of results. However, while one user may include the word "apple" in the search query looking for information on Apple™ computers, another user may be simply interested in the apple fruits.

Accordingly, there is a need in the art for an effective and efficient system and method for processing output of search engines by selecting most relevant search results based on accumulated user preferences.

SUMMARY OF THE INVENTION

Accordingly, the present invention is directed to an implementation of Aggregate Neural Semantic Networks for producing the search results based on accumulated user preferences that substantially obviates one or more of the disadvantages of the related art.

In one embodiment, there is provided a system, method and computer program product for implementation of an Aggregate Neural Semantic Network, which stores the relationships and semantic connections between the key words for each user. The Aggregate Neural Semantic Network processes the search results produced by a standard search engine such as, for example, Google or Yahoo!. The standard search engine returns the same or very similar set of hits for the same user query. This set of hits contains a lot of irrelevant references.

The set of hits produced by the standard search engine is processed by the Aggregate Neural Semantic Network, which selects the hits that are relevant to a particular user based on the previous search queries made by the user. It can also use the semantic connections between the terms (i.e., key words) that are most frequently used by all of the previous Aggregate Neural Semantic Network users. Thus, the Aggregate Neural Semantic Network is constantly updating and self-teaching. The more user queries are processed by the Aggregate Neural Semantic Network, the more comprehensive processing of search engine outputs is provided by the Aggregate Neural Semantic Network to the subsequent user queries.

The user query can include keywords, phrases, documents considered relevant by the user, categories (e.g., general field of the query) or combinations thereof. The Aggregate Neural Semantic Network gets updated based on a query that identifies a plurality of documents considered relevant by a user. It also takes in account the documents considered relevant by other users who submitted the same or a similar query previously.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the embodiment of the present invention, example of which is illustrated in the accompanying drawings.

In one embodiment, there is provided a system, method and computer program product for implementation of an Aggregate Neural Semantic Network which stores the semantics (i.e., relationships and connections between the query terms) for each user. The Aggregate Neural Semantic Network accumulates the particular subsets of the search results produced by a standard search engine such as, for example, Google or Yahoo!. The standard search engines usually return the same or very similar set of hits for the same user query. These hits contain many irrelevant references that need to be sorted out for the user.

The set of hits produced by the standard search engine is processed by the Aggregate Neural Semantic Network, which selects the hits that are relevant to a particular user based on the previous search queries made by the user. It can also use the semantic connections between the terms (i.e. key words) that have been most frequently used by all of the previous Aggregate Neural Semantic Network users. Thus, the Aggregate Neural Semantic Network accumulates a semantic data and updates itself according to the semantic data produced by all of the Aggregate Neural Semantic Network users. The more user queries are processed by the Aggregate Neural Semantic Network, the more comprehensive processing of search engine outputs is provided by the Aggregate Neural Semantic Network to the subsequent user queries.

The user query can include keywords, phrases, documents considered relevant by the user, or combinations thereof. The Aggregate Neural Semantic Network gets updated based on a query that identifies a plurality of documents considered relevant by a user, and what is more important, it also takes in account the documents considered relevant by other users who made the same or a similar query previously.

The Aggregate Neural Semantic Network, according to an exemplary embodiment, is based on a neural network that implements the logical connections between user query terms (i.e., key words). The functionality of the neural network is described in detail in the co-pending U.S. patent application Ser. No. 11/468,048, entitled NEURAL NETWORK FOR ELECTRONIC SEARCH APPLICATIONS, filed on Aug. 29, 2006, which is incorporated herein by reference in its entirety.

The Aggregate Neural Semantic Network, according to the exemplary embodiment, is based on a multi-layer neural network, where each layer consists of a set of neurons (i.e., query terms). The difficult problem of constantly "teaching" the neural network is solved by forming the coefficients of the semantic connections between the neurons.

The neural network uses a single-cycle approach to change the value of the semantic coefficient of the connections. The Aggregate Neural Semantic Network can use neural networks with a certain topology that permits efficient and effective searching of documents. The neural networks, in one embodiment, permit searching of documents that takes into account the context of the search terms (i.e., keywords) and the "meaning" of the words, sentences, clusters of words, documents, and so forth. In one embodiment, the semantic network uses a set of neurons that are not connected to all other neurons on the same layer (or all other neurons on some other layer), but only to a subset of such neurons. Thus, a number of neurons used can be dramatically less than the total number of neurons in the network.

Thus, in the present invention, the context of the search query is displayed to the user by displaying both the terms of the search query itself and additional terms that define the meaning of the query. In the example given above, the word apple can have several meanings—for example, apple the fruit, Apple computer, Big Apple, etc. In the absence of additional terms that define the context of the word apple, the meaning of the apple is ambiguous—it can be any one of these meanings, as well as several others.

By displaying additional terms on the map, the user can further define the meaning, i.e., the context, of the query. The additional terms, therefore, help the user define "what the query is about." Also, the manner of display of the additional terms (i.e., font, color, size, animation, font effects, etc., see also discussion in U.S. patent application Ser. No. 12/234,751, filed on Feb. 2, 2009, incorporated herein by reference; for discussion of visualization of the neural network and the keywords, see U.S. patent application Ser. No. 12/327,422, filed on 03-DEC-2008, incorporated herein by reference, and for a discussion of the application of these ideas to advertising, see co-pending application Ser. No. 12/414,242, filed Mar. 30, 2009, incorporated herein by reference) can help define the relevance of a particular additional terms to the query. Also, the location of the additional terms on a two or three dimensional map (if one is displayed to the user) helps the user understand the relevance of the particular additional term to the term of the search query.

In other words, the closer the particular additional term is to the "meaning" of the query, the more relevant that particular additional term is to the search query term at issue. Note that this is true not only of the situation where one additional term is displayed relative to some single search query term, but is also true of all the additional terms relative to all the search query terms. In other words, the relative position on the map (either in two or three dimensions) of the additional terms illustrate their relevance to the context of the original search query.

By selecting one or more additional displayed terms, the user can specify what he means by his query—in other words, if the user is searching for apple the fruit (or the meaning of his search query is related to apple the fruit, or apple juice, or similar products), he can select additional terms that relate to that concept, and deselect other terms (such as computer) that are irrelevant to his intended search query context.

Extending this idea further, the question is, how is search query context defined? In the simplest case, the search query context can be defined based on a single search, and the additional terms displayed as such. In the more complex case, the context can be defined based on multiple queries, whether by the same user or by other users.

The Aggregate Neural Semantic Network accumulates semantic data for each user session. A session semantic network is created for each user session, in other words, all of the semantic data produced by user searches performed during one session is accumulated into the session semantic network. The session semantic network is then integrated into the Aggregate Neural Semantic Network.

Initially, the Aggregate Neural Semantic Network might not contain meaningful elements, but this changes with each user session. The more user sessions are performed, the more semantic information is accumulated in the Aggregate Neural Semantic Network. During the indexing process, each new word or search term is added to the word layer of the Aggregate Neural Semantic Network. Also, at the time that the new word is added, at least some semantic connections between that new word or search term, and the other neurons of the word layer and the neurons of other layers, can be identified. When the same new word is encountered again, the weights of the corresponding semantic connections, which represent how "close" the words are contextually (i.e., semantically) can be updated. For example, the weight of the semantic connection increases if the relationship between new word i and word j reoccurs in the document.

Note that initially, if no query input is specified through the session semantic network, the Aggregate Neural Semantic Network can be viewed as containing the "word" neurons, and a set of semantic connections between them. A query input processed by the session semantic network, asking what the documents are about, would generate a set of keywords that is essentially based on the frequency of occurrence of the words in the documents, and a general set of semantic connections between the word neurons.

As the user query is propagated back and forth through the session semantic network, the keywords produced by the session semantic network will change, and new keywords may be added. After the session semantic network is integrated into the Aggregate Neural Semantic Network, the semantic connections between the neurons of the Aggregate Neural Semantic Network also change. While these changes may not be that significant after just one user session, the Aggregate Neural Semantic Network can change dramatically after a large number of user sessions, especially if the same or similar user preferences are exhibited. For example, if a hundred of users used the word "apple" in their queries and then proceeded to Apple™ computers, then the semantic connection between words "apple" and "computer" will get stronger, while the semantic connection between, for example, words "apple" and "juice" will get weaker.

Figure 1:
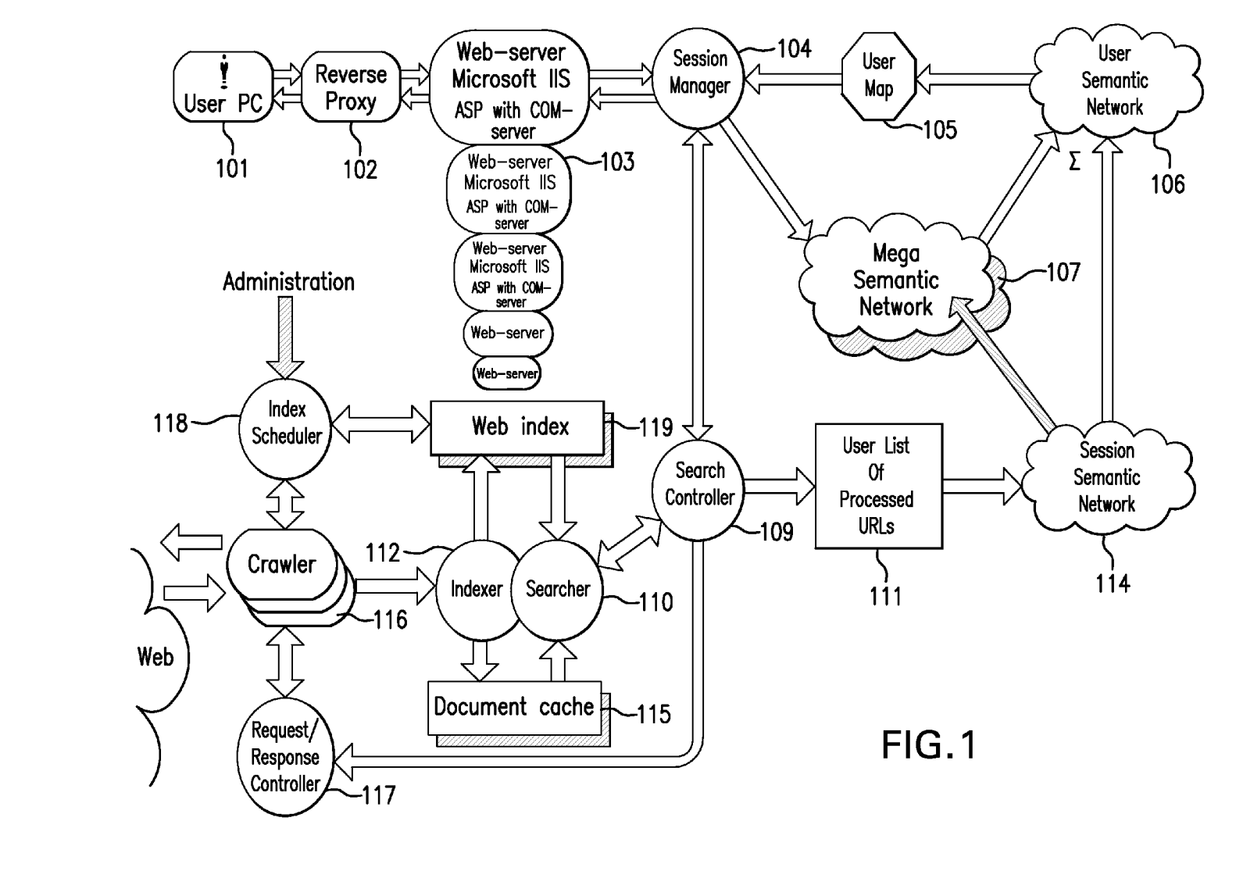
FIG. 1 illustrates system architecture for Aggregate Neural Semantic Network in accordance with an exemplary embodiment.

System architecture for Aggregate Neural Semantic Network, in accordance with an exemplary embodiment, is illustrated in FIG. 1. The architecture for employment of the Aggregate Neural Semantic Network is implemented as multi-layer client-server architecture. A remote PC user 101 sends a search query to a web-server 103. The reverse proxy 102 distributes the incoming search requests among backend web-servers 103. The backend web-servers can be MS IIS, they can be ASP servers that use server-side ASP scripting and AJAX-enabled web pages or they can be servers implemented using COM objects that are invoked via ASP. The system can also use a separate Mega server that contains Aggregate Neural Semantic Network 107 and processes all requests from backend servers. Other web servers such as CGI and ISAPI can be used with Aggregate Neural Semantic Network 107 as well.

A session manager module 104 processes and serves all search requests generated during one user session. The session manager 104 forwards the initial search requests to the Aggregate Neural Semantic Network 107 and to the search controller 109. The search controller 109 produce a list of processed URLs 111, and then a session semantic network 114. The Aggregate Neural Semantic Network 107 and the session semantic network 114 produce a user semantic network 106 (i.e., MegaNet), and the user map is generated based on the user's search query. A user map generated by the user map module 105 provides a user map (via session manager 104) to user PC 101 where it is rendered to a user. The user moves around the user map by clicking on particular terms. After the user selects particular terms on the user map 105, the session manager 104 sends the request for the documents corresponding to the selected terms to a search controller module 109.

The search controller module 109 forwards the request to a searcher module 110. The searcher module 110 receives web index corresponding to the search query terms from web index storage 119 and retrieves a cached document with a corresponding index from document cache 115 that temporarily stores some previously retrieved documents. The cached documents are indexed by a standard indexer module 112.

The search controller 109 also routes user request for the documents to a request/response controller module 117 which passes it on to a search engine crawler 116 for searching the web. The search results (i.e., documents) retrieved from the web by the crawler 116 are indexed by the index scheduler module 118. The index scheduler module 118 is controlled by a system administrator. The index scheduler module 118 provides indexes to the web index storage 119. The crawler 116 also checks if the documents having the same index are already cached and can be retrieved from the document cache 115. The annotations retrieved from the document cache 115 and the annotations retrieved from the web are provided to the search controller 109 by the searcher module 110. The search controller 109 resolves (i.e., processes) all annotations and provides a list of annotations 111 (i.e., processed URLs and some associated text) to a session semantic network 114.

The session semantic network 114 provides the results of each user request to a user semantic network 106 that, in turn, provides these results to a user. The session semantic network 114 accumulates all user preferences (i.e., selected relevant document annotations), and sends them to the Aggregate Neural Semantic Network 107. Thus, the Aggregate Neural Semantic Network 107 gets updated (i.e., is taught) according to the user preferences exhibited during a particular session. The subsequent users (and/or the same user during a subsequent user session) get the aggregated semantic information from the Aggregate Neural Semantic Network 107 for the user semantic network 106, and the user map 105 is generated based on the preferences of the previous users. The Aggregate Neural Semantic Network 107 can reach a very large volume and require a lot of resources, so it can be implemented on a separate computer system (i.e., a mega server or a heavy-duty server).

Figure 2:
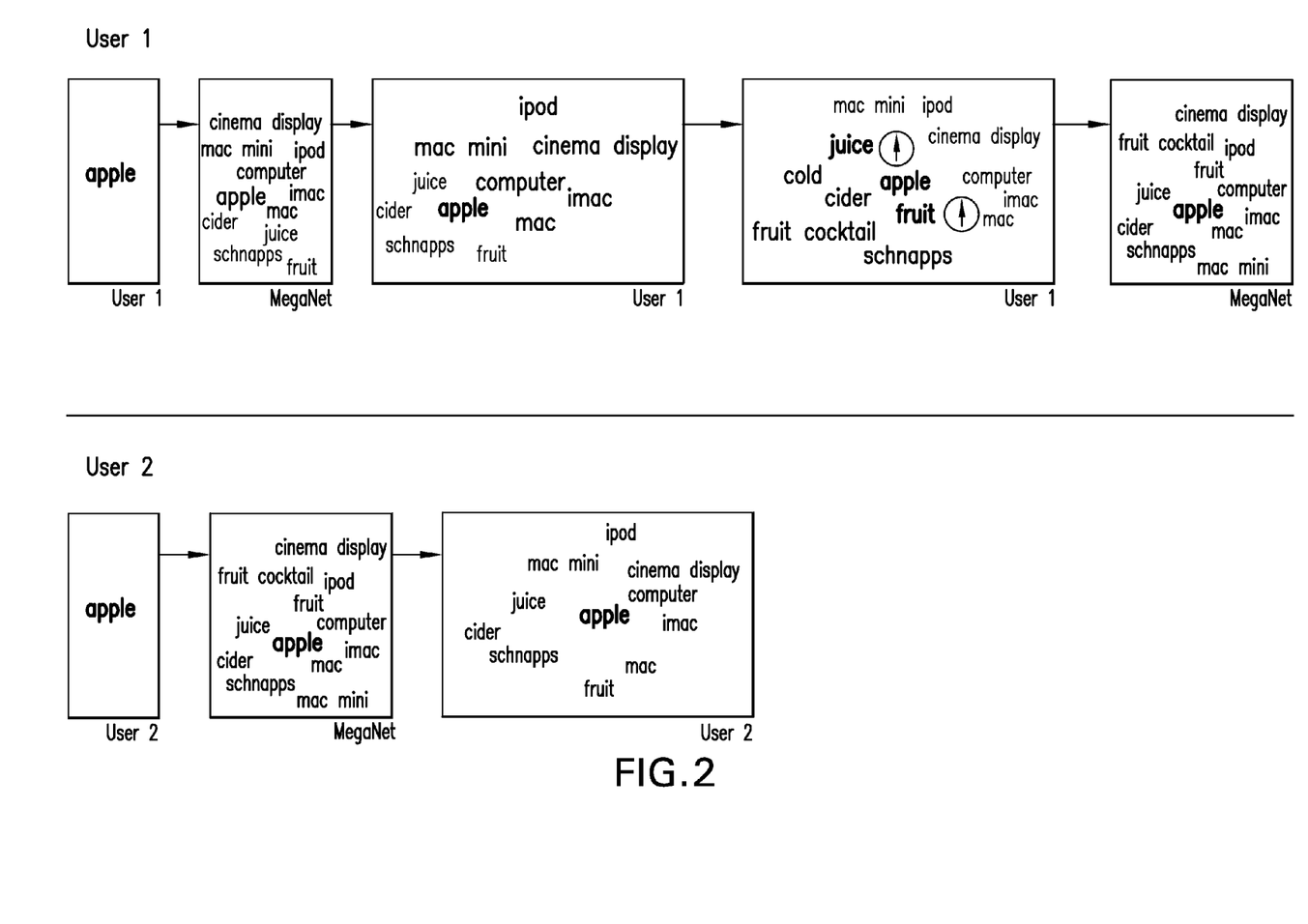
FIG. 2 illustrates exemplary user maps produced by the Aggregate Neural Semantic Network.

The exemplary user maps produced by the Aggregate Neural Semantic Network) are illustrated in FIG. 2. The User 1 enters a search term "apple" and the Aggregate Neural Semantic Network generates a MegaNet from which a User 1 map is generated and presented to the User 1. The User 1 map displays words like computer, cinema display, imac, mac, ipod, etc. in a dark font, indicating a strong semantic connection between the word "apple" and these terms. The words like juice, cider, fruit, etc. are shown in a lighter font, indicating a weaker semantic connection to the word "apple." In this example, the User 1 chooses words "juice" and "fruit" by clicking on them (user actions are shown by the circled arrows on the User 1 map) and the terms like cider, fruit cocktail, schnapps, etc., appear in the dark font on the User 1 map while the words like ipod, mac mini, computer, etc., appear now in lighter font. The User 1 preferences are integrated into the Aggregate Neural Semantic Network, which produces an updated MegaNet that displays all the related to the word "apple" terms in a dark font. Thus, the strength of the semantic connections between certain terms has been changed. Note that this is only an illustrative example, and in reality to produce such significant changes in the MegaNet a number of users would have had to repeat or perform similar actions as the actions of the User 1.

In the illustrated example, a User 2 also enters the search for the word "apple" and gets the updated (based on User's 1 input) MegaNet that contains all the related terms shown in dark font. Thus, the User 2 map generated also contains all the terms in dark font indicating the strength of the semantic connection of these terms to the word "apple." So FIG. 2 illustrates how the actions of the hypothetical User 1 have affected the Aggregate Neural Semantic Network and the user map generated for a subsequent User 2.

It should be noted that the Aggregate Neural Semantic Network described herein is applicable to any collection of documents, regardless of where they are stored. For example, it is applicable to documents stored on the local hard drive, on a corporate network, or on the internet. Furthermore, the Aggregate Neural Semantic Network is highly scalable and is independent of the number of documents involved. In the case of a local hard drive, the documents at issue could be text files, word processing files, email files, attachments to emails, databases, etc.

Figure 3:
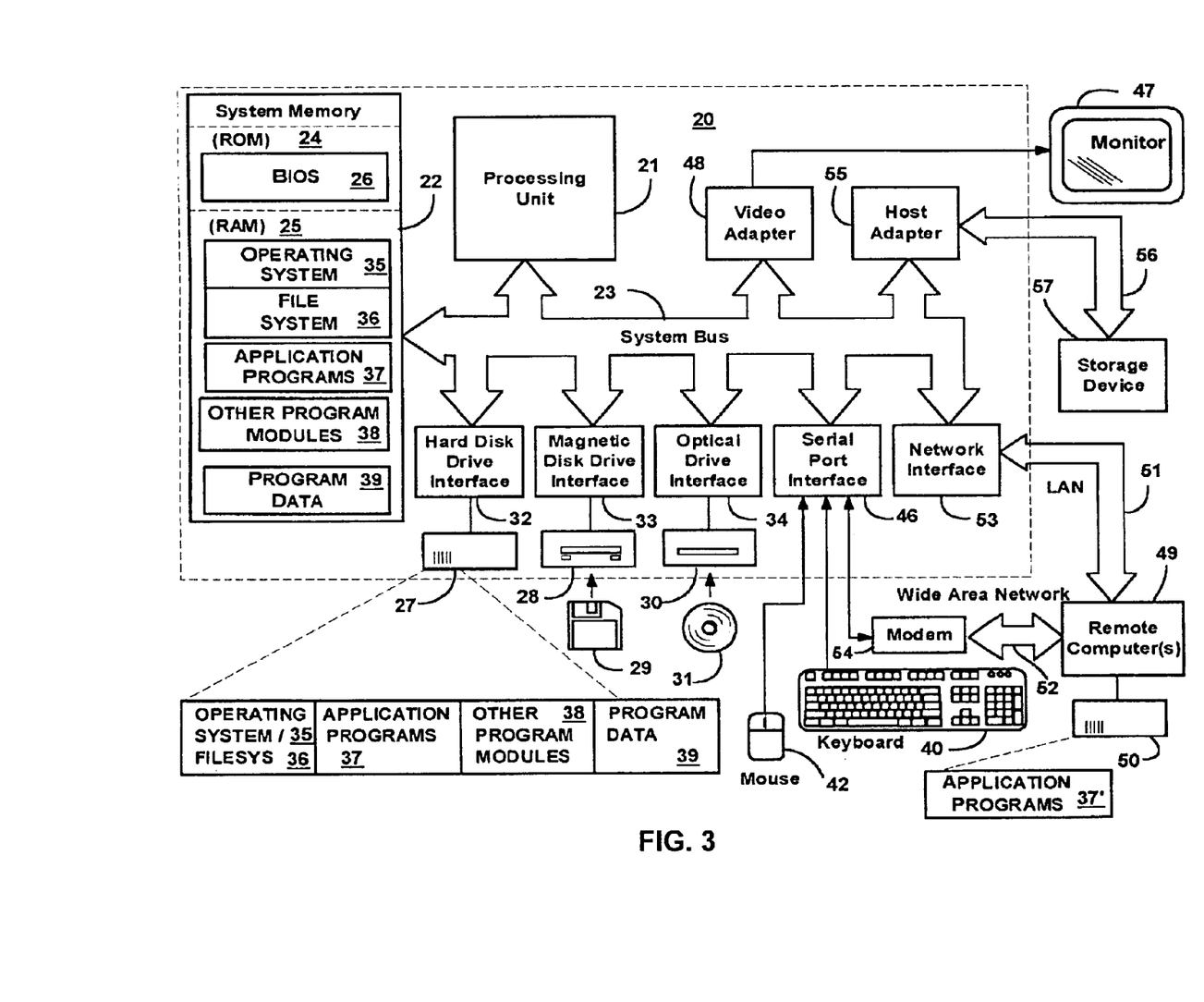
FIG. 3 illustrates an exemplary computer system on which the Aggregate Neural Semantic Network can be implemented.

An example of the computer system where the Aggregate Neural Semantic Network can be implemented is illustrated in FIG. 3. With reference to FIG. 3, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39.

A user may enter commands and information into the personal computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 3. The logical connections depicted in FIG. 3 include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in a remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for processing user search requests comprising:
   a memory;
   a processor configured to execute instructions stored on the memory;
   a semantic neural network configured to create semantic connections between one or more of words, documents, and sentences;
   a session manager configured to process a user search query and provide the user search query to the semantic neural network;
   a user map module configured to generate a user map of search terms based on a subset of the semantic neural network and provide the user map to the user such that the user can select relevant search terms from the user map of search terms, wherein the search terms are semantically related to the user search query;
   a search controller module configured to provide a plurality of search result documents corresponding to the selected relevant search terms, wherein the user can identify relevant documents from the plurality of search result documents; and a semantic neural network update module configured to update the semantic neural network according to at least one of the selected relevant search terms from the user map or the identified relevant documents selected by the user.

2. The system of claim 1, wherein the semantic neural network is implemented on a server.

3. The system of claim 1, wherein the user search query comprises keywords and/or categories.

4. The system of claim 1, wherein the search query comprises documents considered relevant by the user.

5. The system of claim 1, further comprising a web server configured to service the user search query, wherein the webserver is any of:
   a MS ITS server;
   Apache with PHP;
   NGINX;
   http/https server;
   a server with ASP, JS, JSP, Java, Perl or Python scripting; and
   a server with scripting that works with http/https protocols.

6. The system of claim 1, Wherein updating the semantic neural network comprises changing a relevance of neurons relative to each other in response to selection of the identified relevant documents by the user.

7. The system of claim 1, wherein the semantic neural network is a bidirectional network.

8. A method for processing user search requests comprising:
   receiving a search query from a user at a web server manager;
   processing the search query by a session manager and sending the search query to a neural network;
   generating, at a user map module, a user map of search terms based on a subset of the neural network;
   providing the user map to the user such that the user can select relevant search terms from the user map, wherein the search terms are semantically related to the user search query;
   processing search terms selected by the user from the user map;
   providing, via a search controller module, one or more search result documents corresponding to the selected search terms to the user;
   receiving a selection of at least one of the one or more search result documents from the user; and
   updating the neural network according to at least one of the selected relevant search terms from the user map or the at least one of the one or more search result documents selected by the user.

9. The method of claim 8, wherein the neural network is implemented on a second server.

10. The method of claim 8, wherein the neural network is implemented on a server cluster.

11. The method of claim 10, wherein the search query is sent via a reverse proxy.

12. The method of claim 10, wherein the search query is sent via a secure connection.

13. The method of claim 8, wherein the search query comprises one or more of keywords and categories.

14. The method of claim 8, wherein the search query comprises documents identified as relevant by the user.

15. The method of claim 8, wherein updating the neural network comprises changing a relevance of neurons relative to each other in response to selection of the at least one of the one or more search result documents by the user.

16. A computer-readable storage medium having instructions stored thereon, the instructions comprising:
   instructions to receive a search query from a user;
   instructions to process the search query;
   instructions to send the search query to a neural network;
   instructions to generate a user map of search terms based on a subset of the neural network;
   instructions to provide the user map to the user such that the user can select relevant search terms from the user map, wherein the search terms are semantically related to the user search query;
   instructions to process search terms selected by the user from the user map;
   instructions to provide to the user one or more search result documents corresponding to the selected search terms;
   instructions to receive a selection of at least one of the one or more search result documents from the user; and
   instructions to update the neural network according to at least one of the selected relevant search terms from the user map or the at least one of the one or more search result documents selected by the user.

17. The system of claim 1, wherein the semantic neural network comprises semantic connections between the one or more of words, documents, and sentences based on aggregated semantic information generated from preferences of a plurality of previous users.

18. The method of claim 1, wherein the neural network comprises semantic connections between the one or more of words, documents, and sentences based on aggregated semantic information generated from preferences of a plurality of previous users.

19. The method of claim 8, further comprising receiving a selection from the user of one or more of the search terms from the user map.

* * * * *

UNITED STATES PATENT AND TRADEMARK OFFICE
CERTIFICATE OF CORRECTION

PATENT NO. : 8,180,754 B1
APPLICATION NO. : 12/416210
DATED : May 15, 2012
INVENTOR(S) : Ershov Page 1 of 1

It is certified that error appears in the above-identified patent and that said Letters Patent is hereby corrected as shown below:

In Column 9, Line 18, in Claim 5, delete "ITS" and insert -- IIS --, therefor.

In Column 9, Line 25, in Claim 6, delete "Wherein" and insert -- wherein --, therefor.

In Column 10, Line 43, in Claim 18, delete "Claim 1" and insert -- Claim 8 --, therefor.

Signed and Sealed this
Thirteenth Day of November, 2012

David J. Kappos
*Director of the United States Patent and Trademark Office*